(12) United States Patent
Park

(10) Patent No.: US 7,242,971 B2
(45) Date of Patent: Jul. 10, 2007

(54) POWER SAVING METHOD FOR MOBILE COMMUNICATION TERMINAL

(75) Inventor: Won Hyung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 182 days.

(21) Appl. No.: 10/117,058

(22) Filed: Apr. 8, 2002

(65) Prior Publication Data

US 2002/0177475 A1 Nov. 28, 2002

(30) Foreign Application Priority Data

May 25, 2001 (KR) .............................. 2001-29032

(51) Int. Cl.
*H04M 1/00* (2006.01)
(52) U.S. Cl. ................ 455/574; 455/127.5; 455/393.1; 455/343.5; 455/575.3
(58) Field of Classification Search ................ 455/423, 455/13.4, 550.1, 574, 572, 579.1, 579.3, 455/90.3, 343.1, 343.2, 343.3, 343.4, 343.5, 455/343.6, 556.1, 127.1, 127.5, 550, 343; 455/556, 127, 211, 566, 414.1, 561, 524; 379/433.06, 433.07, 368; 345/211–214, 345/102
See application file for complete search history.

(56) References Cited

U.S. PATENT DOCUMENTS

| | | | | |
|---|---|---|---|---|
| 5,870,685 A * | 2/1999 | Flynn .......................... | 455/573 |
| 6,138,032 A * | 10/2000 | Hill et al. .................... | 455/517 |
| 6,275,712 B1 * | 8/2001 | Gray et al. .................. | 455/522 |
| 6,278,887 B1 * | 8/2001 | Son et al. .................... | 455/566 |
| 6,294,895 B1 * | 9/2001 | Kukai .......................... | 320/132 |
| 6,584,330 B1 * | 6/2003 | Ruuska ....................... | 455/574 |
| 6,667,731 B2 * | 12/2003 | Park ............................ | 345/102 |
| 6,725,064 B1 * | 4/2004 | Wakamatsu et al. ........ | 455/566 |
| 6,731,958 B1 * | 5/2004 | Shirai ........................... | 455/574 |
| 2002/0142792 A1 * | 10/2002 | Martinez ..................... | 455/550 |

* cited by examiner

*Primary Examiner*—Pablo N. Tran
(74) *Attorney, Agent, or Firm*—Ked & Associates, LLP

(57) ABSTRACT

A power saving method for a mobile telephone is disclosed that can increase the useful life of a battery charge by temporarily turning off non-essential telephone functions not required for call transmission or reception. The method determines whether the remaining capacity of the telephone battery is smaller than a predetermined reference value. The power saving method includes the steps of setting an activation condition for non-essential telephone functions, detecting a state that satisfies the activation condition, measuring the remaining capacity of the telephone's battery if the activation condition is satisfied, and controlling an activation operation of the non-essential telephone functions by comparing the measured remaining charged capacity with a reference value. The power saving method may include saving to and recalling from memory user preference settings when a user function is de-activated and re-activated, respectively.

35 Claims, 3 Drawing Sheets

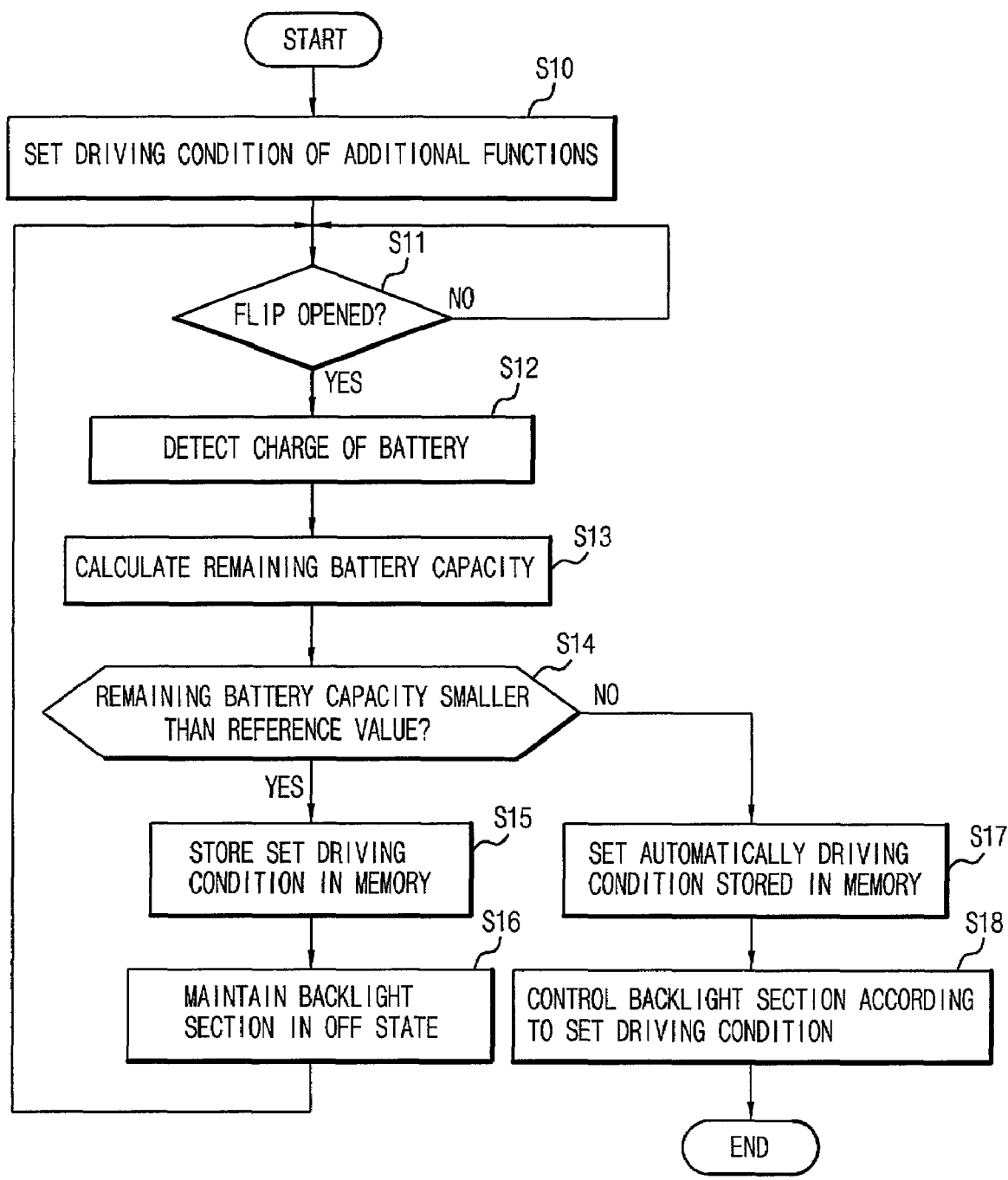

POWER SAVING METHOD FOR MOBILE COMMUNICATION TERMINAL

BACKGROUND OF THE INVENTION

1. Field of the Invention

The present invention relates generally to a telephone, and more particularly, to a mobile telephone.

2. Background of the Related Art

Referring to FIG. 1, a related art mobile terminal or subscriber unit includes a mobile station modem (MSM) 10, and user functions such as a vibration motor 11, back-light circuitry 12, audio alert circuitry 13, and LED display 14. The operations of the MSM 10 include controlling an audio alert 13 such as a buzzer or ringer, the vibration motor 11, and the back-light circuitry 12 and/or the LED display 14 user functions. The MSM 10 controls the user functions by detecting an input from a key button on the keypad, the opening of the telephone's flip, or reception of an incoming call.

A user can select desired user preferences for controlling the operation of the user functions through a menu. For example, the user can select the user preferences so that the back-light is turned on when the flip is opened or when the phone rings. The user can also set the user preferences so that when the phone rings, the MSM 10 drives the vibration motor 11 or audio alert 13 according to the user's menu settings, and then activates the back-light 12. When any user function is activated, power is supplied to the circuitry driving the user function from the battery.

Based on the type of mobile terminal, the user may set the user preferences to enhance the convenience of using the terminal by enabling or disabling certain user functions. For example, the user may alternatively set the user preferences to turn on the back-light by activating the back-light section 12 with the MSM. In the case of a bar type terminal, the back-light can be set to turn on when the phone rings or when the user presses a key button to key-in a telephone number. In case of a flip type or folder type terminal, the back-light can be set to activate when the phone rings or the user opens the flip or cover to place a call.

The related art mobile terminal has various problems. For example, user functions that are not essential to telephone call transmission or reception are performed whenever its user preference settings are satisfied. Thus, selected user functions will continue to be activated irrespective of the remaining capacity of the battery.

Specifically, in the case of the bar type mobile-telephone, the back-light, vibration motor, and audio alert may be set to activate whenever a key button is pressed or the phone rings. These features draw substantial current from the battery. In the case of the flip type or folder type mobile telephone, the back-light may activate whenever the user opens the flip or cover and the telephone is in standby mode and presents similar power consumption problems.

Moreover, other additional functions such as the vibration motor, LED, etc., are always activated irrespective of the remaining capacity of the battery, whenever the condition for the user preference is satisfied. Thus, even when the battery power is low, the same amount of current is consumed as when the battery power is high. Accordingly, when the battery power is low, the continued operation of the user functions depletes the already small amount of power remaining in the battery, and unnecessarily limits the remaining time during which the mobile telephone can transmit or receive a telephone call.

SUMMARY OF THE INVENTION

An object of the invention is to substantially solve one or more the above problems and/or disadvantages in a whole or in part and to provide at least the advantages described hereinafter.

Another object of the present invention is to reduce the current consumption of a battery in a mobile communication terminal.

Another object of the present invention is to increase the time between recharges of a battery.

Another object of the present invention is to selectively control additional user functions not directly required to transmit or receive a telephone call in accordance with the power remaining in the terminal's battery.

In order to achieve at least the above objects in a whole or in parts, there is provided a method to save power for a telephone including the steps of setting user preferences to control user functions based on certain activation conditions, detecting a state that satisfies the activation condition, measuring a remaining capacity of a battery if the activation condition is satisfied, and controlling a driving operation of the additional functions by comparing the remaining capacity with a reference value.

To further achieve at least the above objects in whole or in parts, there is provided a method to save power for a mobile telephone that includes determining whether the measured remaining capacity of a mobile telephone's battery is smaller than a certain reference value, storing the setting of the activation condition of non-essential user functions in a memory if the measured remaining capacity is smaller than the reference remaining capacity; and deactivating user functions irrespective of the set activation condition.

To further achieve at least the above objects in whole or in parts, there is provided a mobile terminal, which includes a controller for controlling a plurality of user functions, a detector for detecting a remaining capacity of a battery, a deactivator for deactivating at least one of the user functions, and a reactivator for reactivating the user function if the remaining capacity is greater than a reference value.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3 is a chart illustrating a power saving method for a mobile telephone according to the preferred embodiment of the invention.

DETAILED DESCRIPTION OF PREFERRED EMBODIMENTS

A preferred embodiment of the invention includes a power saving method for a mobile communication terminal which selectively disables non-essential telephone user functions when the remaining charge, on the terminal's battery falls below a certain value or a reserve power condition.

Figure 1:
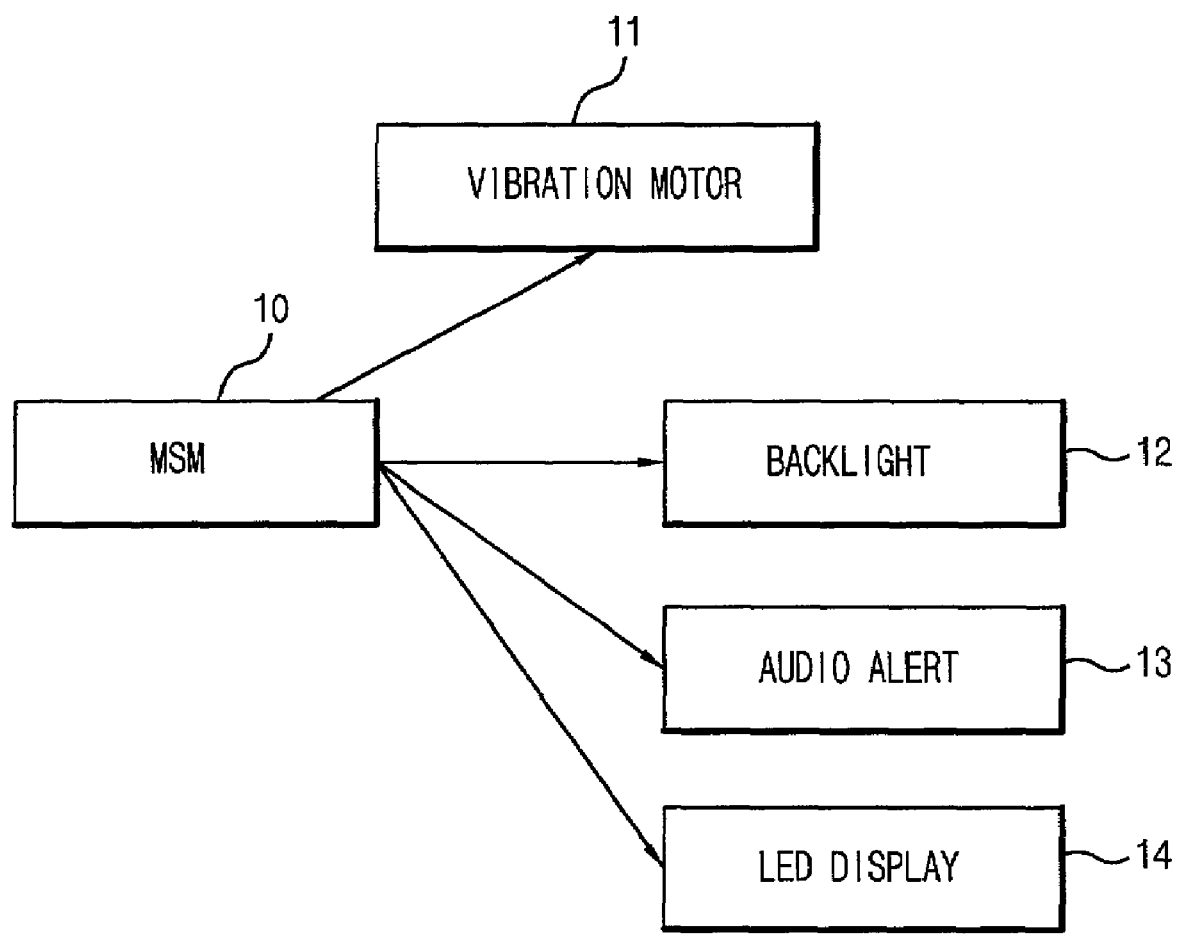
FIG. 1 is a block diagram illustrating the relationship of components of a related art mobile telephone.
Figure 2:
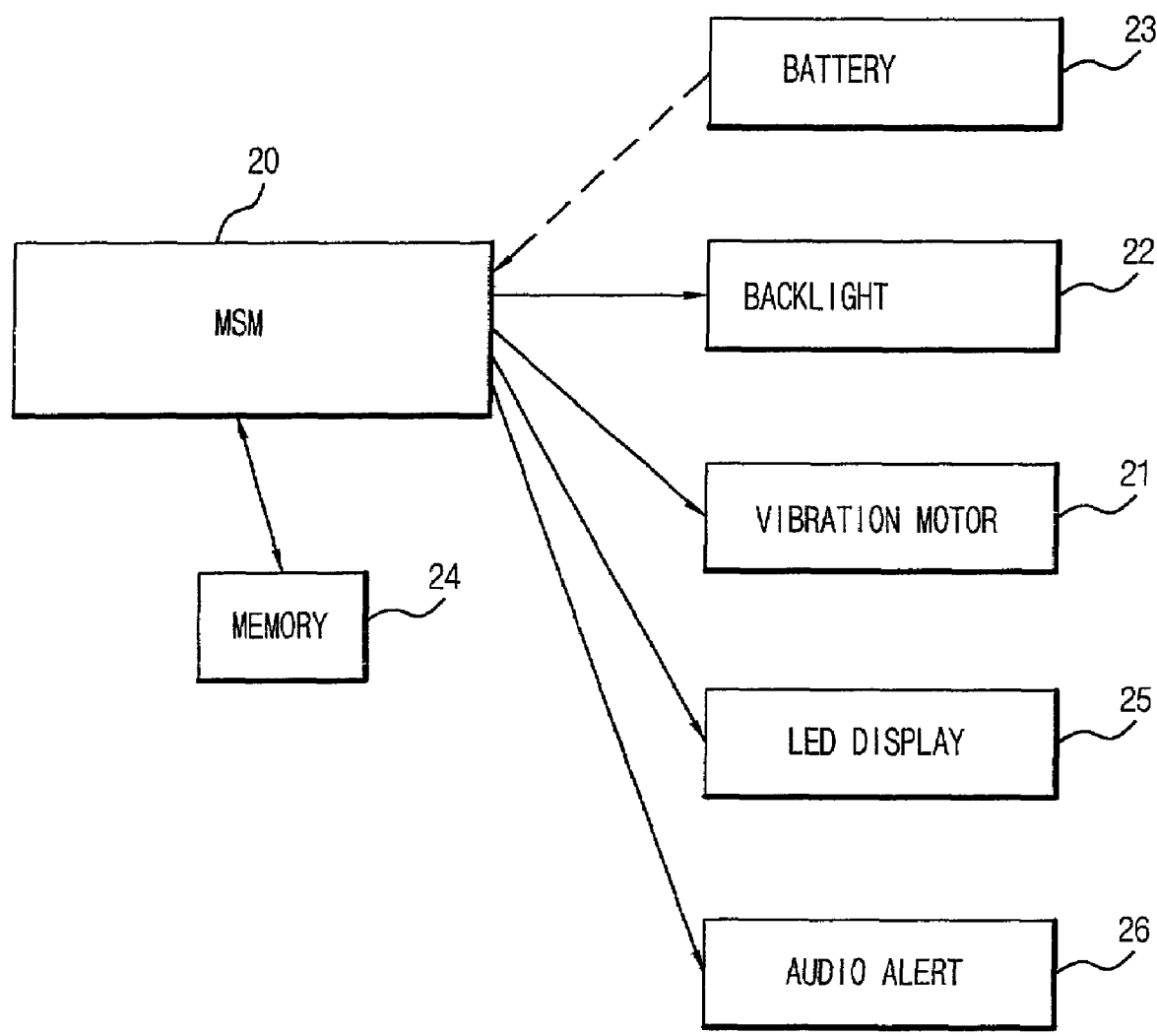
FIG. 2 is a block diagram illustrating the relationship between components of a mobile telephone according to the preferred embodiment of the invention.

FIG. 2 shows a preferred embodiment of mobile station according to the present invention. The teirminal preferably includes a mobile station modem (MSM) 20, which performs control operations of the mobile telephone. If an activation condition of a user function set by a user is satisfied, the MSM 20 checks the remaining charge of a battery 23, and selectively activates the user function component. Such user functions may include a vibration motor 21, a back-light 22 for the terminal's information display panel, a LED display 25, or an audio alert 26. The MSM 20 is preferably coupled to a memory 24. The memory 24 is configured to store user preferences for the mobile terminal.

FIG. 3 illustrates a method of saving power in a mobile terminal according to the preferred embodiment. The example in FIG. 3 relates to activating the back-light 22 of FIG. 2. It should be understood that this method could be applied to any combination of user preferences.

Referring to FIGS. 2 and 3, the user first sets the user preference settings controlling the associated user functions or preferences using a menu (S10). In this example, the user sets the user preferences so that the back-light 22 for the telephone information display panel will automatically turn on when a flip is opened. The MSM 20 controls the operation of the user functions, and stores the back-light function user setting in the memory 24.

When the user preference is set so that the back-light 22 is automatically activated when the flip is opened, the MSM 20 detects when the flip is opened (S11). When the flip is opened, the MSM 20 determines the electric charge remaining in the battery (S12). This is preferably done in the form of a voltage or current measurement. The MSM 20 then calculates the remaining capacity of the battery (S13). After the remaining capacity of the battery 23 is measured, the MSM 20 checks whether the remaining capacity is smaller than a prescribed reference value (S14). The reference value is preferably set to be about 20% of the battery's total capacity. It should be understood that the reference value can be changed by the user as needed.

If the MSM 20 determines that the remaining capacity of the battery 23 is less than the prescribed value, the MSM 20 stores the associated user preferences in the memory (S15). In this example, the current back-light setting is stored in memory 24. The MSM 20 further deactivates the back-light 22 setting irrespective of the user preference set by the user (S16). Accordingly, the back-light 22 is not activated if the user opens the flip. This condition is maintained while the battery charge is below the prescribed level.

Thereafter, when the battery 23 is charged, and the remaining capacity of the battery 23 becomes greater than the prescribed level, the MSM 20 recalls the user preferences stored in the memory 24, and automatically resets those parameters (S18). Thus, the activation parameter of the back-light is re-established. If the user then opens the flip, the MSM 20 activates the back-light 22 according to the user preference settings (S18).

The embodiment of the invention illustrated in FIG. 3 is an example where the back-light 22 user preference is set so that the back-light is activated whenever the flip is opened. However, the present invention is not limited to such an embodiment and can be also applied to any set of user preferences. For example, the user preference functions could be set so that the back-light 22 is turned on whenever a key button is pressed, or the phone rings, etc. Further, an embodiment of the invention can be applied to other user functions such as the vibration motor 21, in addition to the back-light 22. When applied to the vibration motor 21 the user preference may be set so that the force of the vibration motor 21 is reduced, or the vibration motor is completely de-activated.

In addition to the user functions illustrate herein, an embodiment of the invention can be applied to other additional user functions that are not essential to the audio and text data transmission and reception of a telephone call. Such additional user functions may include an LED display 25, or an audio alert 26. Other embodiments of the invention may include simultaneously de-activating multiple user functions.

As described above, the preferred embodiment of the invention has many advantages. For example, user set preference functions that are not directly required for the audio and text data transmission and/or reception can be temporarily de-activated in accordance with the remaining capacity in the telephone battery 23. Thus, the useful life between re-charges of the battery 23 can be extended.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A power saving method for a mobile terminal, comprising:
   determining a setting of an activation condition for at least one user function;
   measuring a remaining power capacity of a battery if the activation condition occurs; and
   controlling the at least one user function based on the remaining power capacity of the battery,
   wherein controlling the at least one user function comprises:
   determining whether the remaining power capacity of the battery is smaller than a prescribed reference value;
   storing the setting of the activation condition in a memory if the remaining power capacity of the battery is smaller than the prescribed reference value; and
   deactivating the at least one user function from the enabled activation condition irrespective of the setting of the activation condition for the at least one user function.

2. The method of claim 1, wherein the activation condition is determined by inputs from a user menu.

3. The method of claim 1, wherein the at least one user function comprise non-essential telephone functions.

4. The method of claim 1, wherein the at least one user function comprises at least one of a back-light, a vibration motor, an audio alert, and a display.

5. The method of claim 1, wherein the activation condition is that a back-light is activated when a flip is opened on a flip-type mobile telephone.

6. The method of claim 1, wherein the activation condition is that a vibration motor is activated when an incoming telephone call is detected.

7. The method of claim 1, wherein the activation condition is that a back-light is activated when a key button is pressed.

8. The method of claim 1, wherein the activation condition is that a back-light is activated when an incoming telephone call is detected.

9. The method of claim 1, wherein controlling the at least one user function further comprises activating user functions in accordance with the enabled activation condition if the remaining power capacity of a battery is larger than the prescribed reference value.

10. The method of claim 1, wherein controlling the at least one user function further comprises:
recalling the setting of the activation condition stored in the memory if the remaining power capacity of the battery is increased above the prescribed reference value;
setting the activation condition in accordance with the recalled setting; and
activating user functions in accordance with the activation condition.

11. he method of claim 1, wherein the setting of the activation condition is changed from an enabled condition to a disabled condition if the remaining power capacity of a battery is lower than a prescribed value.

12. The method of claim 1, wherein the setting of the activation condition for the user function is one of enabled and disabled.

13. The method of claim 12, wherein the setting is enabled when the user function is activated and disabled when the user function is deactivated.

14. The method of claim 1, wherein the activation condition setting is selected from a user menu.

15. The method of claim 1, wherein the user function comprises at least one of a back-light, a motor, an audio alert and a display.

16. The method of claim 1, wherein the user function comprises non-essential telephone functions.

17. The method of claim 1, further comprising performing said user function in accordance with the set activation condition if the remaining power capacity of the battery is larger than the prescribed reference value.

18. The method of claim 1, further comprising:
recalling the activation setting condition setting from the memory if the remaining power capacity of the battery is increased above the prescribed reference value;
setting the recalled activation condition setting; and
performing the user functions in accordance with the activation condition setting.

19. The method of claim 1, wherein the at least one user function comprises a vibration motor, and a force of the vibration motor is reduced but not completely deactivated when the remaining power capacity of the battery is smaller than the prescribed reference value.

20. A power saving method for a mobile communication terminal, comprising:
determining an activation condition setting for a user function;
detecting whether the activation condition is satisfied;
measuring a remaining power capacity of a battery if the activation condition is satisfied;
determining whether the remaining power capacity of the battery is smaller than a prescribed reference value; and
storing in a memory said activation condition setting if the remaining power capacity of the battery is smaller than the prescribed reference value, and de-activating the corresponding user function regardless of the activation condition setting for the user function.

21. The method of claim 20, wherein the user function comprises a vibration motor, and a force of the vibration motor is reduced but not completely deactivated when the remaining power capacity of the battery is smaller than the prescribed reference value.

22. A mobile communication terminal, comprising:
means for controlling a plurality of user functions;
means for detecting a remaining power capacity of a battery;
means for automatically deactivating at least one of the plurality of user functions in accordance with the remaining power capacity of the battery; and
means for automatically reactivating the at least one deactivated user function,
wherein the means for automatically deactivating at least one of the plurality of user functions comprises:
means for determining whether the remaining power capacity of the battery is less than a prescribed reference value;
means for storing an activation condition of the at least one of the plurality of user functions if the remaining power capacity of the battery is less than a prescribed reference value; and
means for switching-off the at least one of the plurality of user functions if the remaining power capacity of the battery is less than the prescribed reference value without consideration of an activation condition input by a user.

23. The terminal of claim 22, wherein the means for controlling a plurality of user functions comprises:
means for setting an activation condition for at least one of the plurality of user functions;
means for activating the at least one of the user functions in accordance with said activation condition.

24. The terminal of claim 22, wherein the means for detecting the remaining power capacity of the battery comprises means for measuring a voltage of the battery.

25. The terminal of claim 22, wherein the means for reactivating the at least one deactivated user function comprises:
means for recalling an activation condition of the user function from a memory if the remaining power capacity of the battery is greater than a prescribed reference value; and
means for re-setting the recalled activation condition of the at least one deactivated user function to reactivate the at least one deactivated user function.

26. The terminal of claim 22, wherein the at least one user function comprises a vibration motor, and a force of the vibration motor is reduced but not completely deactivated when the remaining power capacity of the battery is smaller than the prescribed reference value.

27. An improved mobile communication terminal, wherein the improvement comprises:
configuring a mobile station modem to determine whether a remaining power capacity of a battery is below a prescribed reference value;
configuring the mobile station modem to store a current setting of a prescribed active user function in a memory if the remaining power capacity of the battery is below the prescribed reference value; and configuring the mobile station modem to automatically deactivate the prescribed active user function if the remaining power capacity of the battery is below the prescribed reference value irrespective of the prescribed active user function.

28. The improvement of claim 27, further comprising:

configuring the mobile station modem to determine whether the remaining power capacity of the battery is greater than the prescribed reference value;

recalling the user setting from the memory if the remaining power capacity of the battery is greater than the prescribed reference value; and activating the associated user preference in accordance with the user setting stored in the memory if the remaining power capacity of the battery is greater than the prescribed reference value.

29. The improvement of claim 27, wherein the prescribed user function comprises a vibration motor, and a force of the vibration motor is reduced but not completely deactivated when the remaining power capacity of the battery is smaller than the prescribed reference value.

30. A mobile communication terminal, comprising:

a mobile station modem configured to control at least one prescribed user function; and a battery coupled to the mobile station modem to provide power to the mobile communication terminal;

wherein the mobile station modem is configured to detect a power reserve condition of the battery and deactivate the at least one prescribed user function if the power reserve condition of the battery falls below a prescribed threshold without referring to any user preferences for deactivating particular functions.

31. The mobile communication terminal of claim 30, wherein the mobile station modem is further configured to reactivate the deactivated at least one prescribed user function if the power reserve condition of the battery rises above a prescribed threshold.

32. The mobile communication terminal of claim 31, further comprising a memory coupled to the mobile station modem and configured to store a setting of the at least one prescribed user function prior to deactivating the at least one prescribed user function.

33. The mobile communication terminal of claim 31, wherein the mobile station modem further comprises a re-activator configured to reactivate the deactivated at least one prescribed user function in accordance with the detected power reserve condition of the battery.

34. The mobile communication terminal of claim 30, wherein the mobile station modem comprises a detector configured to detect the power reserve condition of the battery, and a de-activator configured to deactivate the at least one prescribed user function in accordance with the detected power reserve condition of the battery.

35. The mobile communication terminal of claim 30, wherein the at least one prescribed user function comprises a vibration motor, and a force of the vibration motor is reduced but not completely deactivated when the power reserve condition of the battery is smaller than the prescribed threshold.

* * * * *